TELEPHONE MICROPHONE CUTOFF

Filed Jan. 15, 1968

INVENTORS
EDWARD N. BRENNAN
CLIFFORD P. HARRIS
BY
Robert W. Beach
ATTORNEY

United States Patent Office 3,518,380
Patented June 30, 1970

3,518,380

TELEPHONE MICROPHONE CUTOFF

Edward N. Brennan, 7016 Pleasant St. SW., Tacoma, Wash. 98499, and Clifford P. Harris, 34043 51st Ave. S., Auburn, Wash. 98002

Filed Jan. 15, 1968, Ser. No. 697,989
Int. Cl. H04m *1/19*
U.S. Cl. 179—167 10 Claims

ABSTRACT OF THE DISCLOSURE

The microphone capsule of a telephone handset is rotatively integrated with the perforated screw cap of the microphone. The ring contact of the microphone has an insulating patch engageable by the ring contact-engaging terminal when the microphone cap is unscrewed slightly from fully-tightened position so as to interrupt the circuit between the telephone cord and the microphone capsule. An index and indicia cooperating between the microphone cap and the handset case indicate visually whether the microphone capsule circuit is completed or broken.

Figures 1, 2, 3, 4:
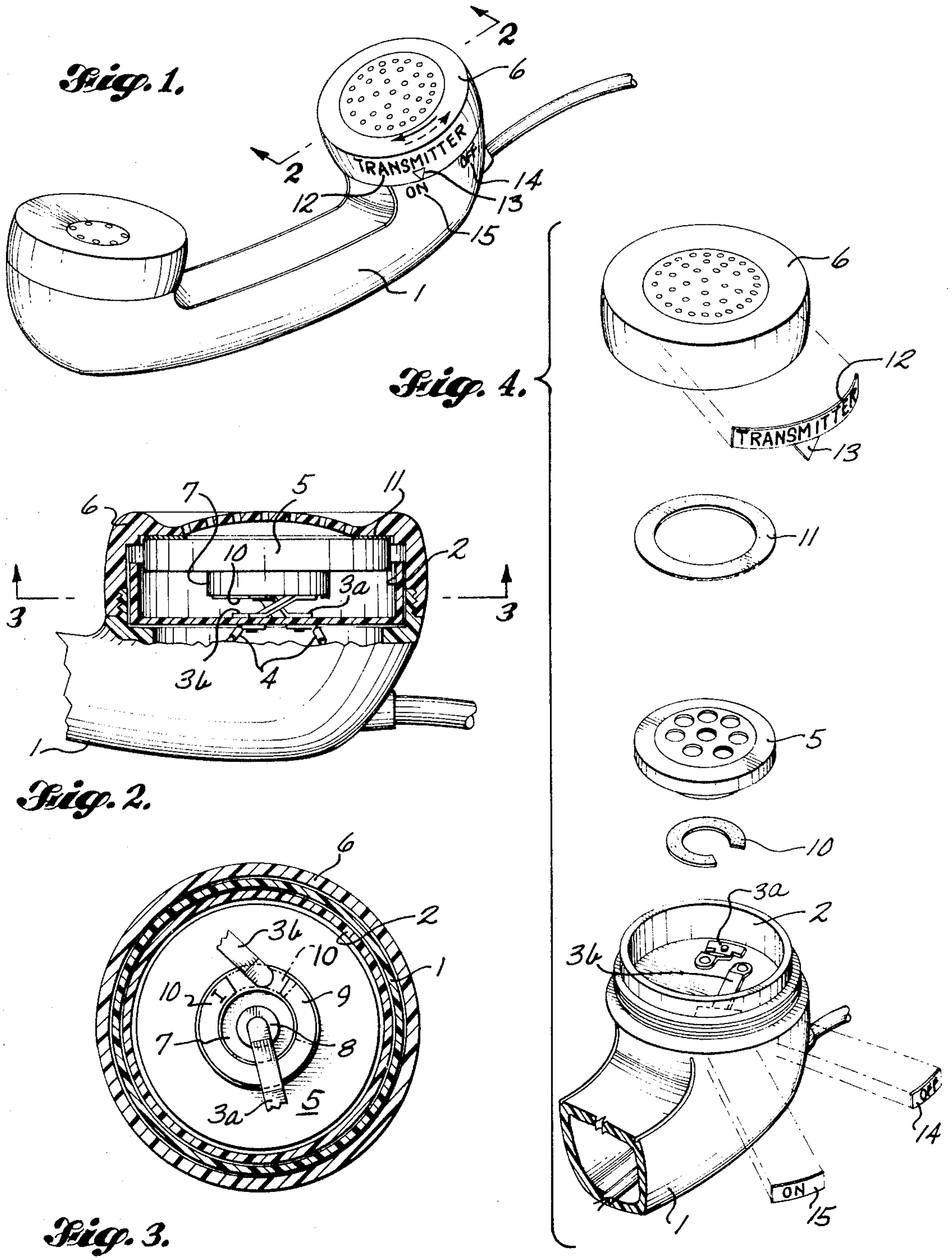

In the use of a telephone, it is desirable on occasion to inactivate the transmitting mechanism such as to eliminate the effect of background noise on the microphone while a person using the telephone is listening or to enable such person to talk to another in the room while listening without such conversation being heard by the other party to the telephone conversation, for example, to request that noise interfering with the telephone conversation be reduced. The present invention operates somewhat like the microphone used in short wave radiophone communication in which it is necessary to close a switch to transmit. Also, the present invention serves somewhat the same function as a hold button on a telephone desk set, except that when such a hold button is pressed the circuits to both the speaker and the microphone of the handset are disconnected.

An object of the present invention is to provide a telephone microphone cutoff which is simple to install on a conventional telephone and the conversion components of which can be supplied in a kit form so that the householder can install the cutoff himself without difficulty. A more specific object is to provide such a cutoff which can be installed with minimum structural alteration to the telephone and which preferably can be removed easily to restore the telephone to its original condition.

Another object is to provide such a telephone cutoff which is very economical yet which is effective and durable. Such a cutoff can be installed so that it cannot incapacitate the telephone if it is properly installed and used.

A further object is to provide a telephone cutoff which is simple and quick to operate and which can be utilized at will, the use of which not being mandatory in order to operate the telephone.

In addition, it is an object to provide such a telephone cutoff which will afford a definite visual indication as to when the cutoff is effective and when it is inoperative.

It is also an object to provide a telephone cutoff installation which is unobtrusive, virtually weightless and which is not unsightly.

FIG. 1 is a top perspective of a conventional telephone handset to which the microphone cutoff has been applied. FIG. 2 is a side elevation of the transmitter end of the handset with parts broken away along line 2—2 of FIG. 1. FIG. 3 is a section through the transmitter end of the handset taken on line 3—3 of FIG. 2.

FIG. 4 is a top perspective of the transmitter end of a telephone handset to which the microphone cutoff has been applied, with parts being shown in exploded relationship.

The telephone handset 1 is of conventional type, including a central handle carrying a receiver housing a speaker on one end and a transmitter housing a microphone on its opposite end. The body of the handset is hollow at the transmitter end to receive a cup 2 of insulating material which serves as a mounting for two spring finger terminals 3*a* and 3*b* connected respectively to wires 4 passing through the telephone cord. The principal component of the microphone is the capsule 5 received in the body cavity and which operates to convert sound waves into electrical impulses which are transmitted over the telephone lines.

In a conventional telephone microphone, the capsule 5 is placed loosely in the transmitter body cavity and is held in place by the perforate screw cap 6, which is screwed onto the transmitter case to close the transmitter body cavity. Such capsule has a boss 7 on its underside, the face of which has a central contact 8 encircled by a ring contact 9 concentric with the central contact and spaced from it by an annular groove. When the screw cap 6 is screwed onto the transmitter case, the inner side of such cap bears against the microphone capsule and presses it into the cavity so that the central contact 8 is pressed firmly against one of the spring finger terminals 3*a* mounted on cup 2 and the ring contact 9 is pressed firmly against the other spring finger contact 3*b* to complete a circuit through the microphone capsule.

In the usual telephone transmitter, the provision of a ring 9 as a contact for engagement with the terminal 3*b* makes the rotative orientation of the capsule 5 relative to the transmitter case and cap 6 immaterial. Consequently, the capsule bears no specific rotative relationship to the cap 6 and these parts may be rotated relatively without prejudice to the operability of the transmitter. It is a feature of the present invention, however, for the capsule 5 and the cap 6 to be rotatively integrated for conjoint rotation as the cap is screwed onto the case. Such integration can be effected by bonding the capsule to the cap in a suitable manner so that the capsule is carried by the cap. Conveniently, such bonding of the capsule to the cap can be effected by interposing between the capsule and the cap an adhesive ring 11 such as of double-sided pressure-sensitive tape.

The purpose of rotatively integrating the capsule 5 and the cap 6 is to enable the capsule to be turned relative to the contact 3*b* by rotation of the cap relative to the case. The contact ring 9 has on it an insulating patch 10 located so that the spring finger terminal 3*b* will contact such patch when the cap 6 is unscrewed a small fraction of a turn from fully-tightened position. When the cap is fully tightened on the case, the spring finger terminal 3*b* will bear against the ring contact 9 of the capsule alongside the insulating patch 10, as shown in FIG. 3. Rotation of the cap 6 through a small fraction of turn in the unscrewing direction will rotate capsule 5 relative to cup 2 and spring finger 3*b* so that the insulating patch will be shifted from the solid-line position of FIG. 3 to the broken-line position.

When the patch 10 is in the broken-line position of FIG. 3, the electrical connection between the wire 4 feeding spring finger terminal 3*b* and the microphone capsule 5 will be interrupted so as to cut off the transmitting circuit. When the cap 6 again is tightened on the case, the insulating patch will be shifted from the broken-line cutoff position of FIG. 3 to the solid-line position of that figure. Consequently, it is important for the telephone user to be able to determine quickly and easily whether the insulating patch 10 is in the solid-line position of FIG. 3 so that the telephone microphone is in normal operation, or in the broken-line position of that figure so that the microphone is inoperative. To provide a visual indication as to whether the cutoff mechanism is or is not in operation, suitable cutoff condition indicating means are provided on the exterior of the cap 6 and transmitter case.

In FIG. 1, cooperating labels on the cap 6 and handset case are shown as including a label strip 12 on the cap having an index pointer 13 which cooperates with an "OFF" label 14 and an "ON" label 15 on the case. Such labels 14 and 15 are spaced circumferentially around the case such that when the index 13 is in registry with the "ON" label 15 the cap will be in the fully-tightened position and the insulating patch 10 will be in the full-line position of FIG. 3 so that the spring finger terminal **3*b* bears on the contact ring 9. When the cap 6 is unscrewed a fraction of a turn so that the index 13 is opposite the label "OFF," the capsule 5 will have been rotated by rotation of the cap 6 relative to the case so that the insulating patch 10 has been shifted to the broken-line position of FIG. 3. In this position, the spring finger contact 3*b*** bears on the insulating patch rather than on the contact ring so that the circuit to the transmitter microphone is interrupted.

The labels 12, 13, 14 and 15 can be of any suitable type which is easily applied and preferably which is easily removed. Such labels may be of the decalcomania type or may be adhesive labels. Whichever type is provided, a cutoff conversion kit need include merely the adhesive ring 11, the adhesive insulating patch 10, the index 13 preferably provided as part of a strip 12, and the "OFF" and "ON" stickers 14 and 15.

To install the telephone cutoff, the label 15 bearing the legend "ON" is first installed at a location on the transmitter case where it can be seen readily by the user. Next, the label 14 bearing the legend "OFF" is applied to the transmitter case a short distance counterclockwise from the label 15. With the transmitter screw cap 6 fully tightened, the strip 12 is then stuck to the transmitter screw cap 6 with the index pointer 13 in registry with the legend "ON." The cap 6 is then unscrewed from the transmitter case and the adhesive ring 11 fitted into it. Next, the capsule 5 is pressed against the ring. If such ring is of double-sided pressure-sensitive tape, the capsule will now be rotatively integrated with, and carried by, the cap.

The final operation is to apply the insulating patch 10 to the ring contact 9 spaced circumferentially clockwise from the index 13 an angle equal to the angle between the "OFF" label 14 and the spring finger terminal **3*b*. Such location of the insulating patch will insure that when the index 13 is in registry with the label 14, the spring finger terminal 3*b* will bear against the insulating patch 10 in the broken-line position of FIG. 3 so as to interrupt the circuit through the microphone capsule 5. Conversely, when the cap 6 is turned clockwise from such position to tighten it fully, the insulating patch 10 will have been turned from the broken-line position of FIG. 3 to the full-line position of that figure so that the cutoff is in the "ON" position and the telephone microphone will operate in a normal manner as long as the cap 6** remains in its fully-tightened position.

The insulating patch 10 is shown as being an arc of approximately 300°, but it need only be of sufficient arcuate extent clockwise from the end shown in FIG. 3 at the right of spring finger terminal **3*b* to enable a portion of the patch to be placed conveniently in registry with such terminal when it is desired for the cutoff to be operative. By using a patch of great arcuate extent, the amount of rotation of cap 6** required to effect microphone cutoff is not at all critical.

The transmitter cap 6 is secured onto the case by turning it in a clockwise direction a couple of full turns so that the microphone is fully operative. When the screw cap has been backed off a fraction of a turn to move the index pointer 13 from the "ON" designation to the "OFF" designation the cap will still be tightened adequately to maintain firm contact between the spring finger terminals **3*a* and 3*b* and the respective microphone contacts 8 and 9. Rotation of the capsule 5 relative to the case will not effect rotation of the insulating cup 2 relative to such case resulting from friction between the contact ring 9 and a spring finger terminal 3*b* because the conventional telephone structure includes key means engaged between the cup 2 and the transmitter case to prevent relative rotation of these parts. If the cup 2 were permitted to rotate relative to the case, the wires 4 leading to the spring finger terminals 3*a* and 3*b*** might be twisted undesirably.

We claim:

1. Telephone cutoff mechanism for a telephone transmitter having a microphone capsule received in a cavity of the transmitter case closed by a threaded cap bearing against such capsule and pressing a contact ring of such capsule against a spring finger terminal substantially immovable circumferentially of the transmitter case, said mechanism comprising means rotatively integrating the capsule and the cap, and an insulating patch on a portion of the capsule contact ring engageable by the spring finger terminal in a predetermined rotative relationship of the capsule and cap to the case.

2. The mechanism defined in claim 1, in which the means rotatively integrating the capsule and the cap include adhesive means.

3. The mechanism defined in claim 2, in which the adhesive means include a double-sided pressure-sensitive tape ring.

4. The mechanism defined in claim 1, in which the insulating patch is an adhesive patch adhered to the capsule contact ring.

5. The mechanism defined in claim 1, and indicating means cooperating between the cap and the case indicating the rotative relationship of the cap and the case.

6. The mechanism defined in claim 5, in which the indicating means includes indicia and an index cooperating with and movable relative to said indicia by rotation of the cap relative to the transmitter case.

7. The mechanism defined in claim 6, in which the indicia includes the designation "OFF" and the designation "ON" spaced circumferentially of the transmitter case.

8. The mechanism defined in claim 6, in which the index is on the cap and the indicia includes the designation "OFF" and the designation "ON" on the transmitter case, which designations are spaced apart circumferentially of the case and cooperate selectively with the index by rotation of the cap relative to the case.

9. The mechanism defined in claim 6, in which the index is on the cap, the case bears indicia cooperating with such index, and the angle between the index and the insulating patch is approximately equal to the angle between the indicia on the case indicating the cutoff as being in operation and the spring finger terminal engageable with the capsule contact ring.

10. The mechanism defined in claim 6, in which the index and indicia coooperating therewith indicating that the cutoff is in operation are in registry when the cap has been unscrewed a small fraction of a turn from its fully-tightened position.

References Cited

UNITED STATES PATENTS 2,838,615 6/1958 Leifer -------------- 179—167

WILLIAM C. COOPER, Primary Examiner